United States Patent
Dundjerski et al.

(10) Patent No.: US 11,003,641 B2
(45) Date of Patent: May 11, 2021

(54) AUTOMATIC DATABASE TROUBLESHOOTING

(71) Applicant: Microsoft Technology Licensing, LLC, Redmond, WA (US)

(72) Inventors: Dejan Dundjerski, Belgrade (RS); Mladen Pantic, Belgrade (RS); Igor Ilic, Belgrade (RS); Petar Lotrean, Belgrade (RS); Stefan Lazic, Belgrade (RS); Conor John Cunningham, Austin, TX (US); Veljko Vasic, Belgrade (RS); Jovan Cukalovic, Belgrade (RS); Vukasin Jovic, Belgrade (RS); Djordje Petrovic, Belgrade (RS)

(73) Assignee: Microsoft Technology Licensing, LLC, Redmond, WA (US)

( * ) Notice: Subject to any disclaimer, the term of this patent is extended or adjusted under 35 U.S.C. 154(b) by 513 days.

(21) Appl. No.: 15/817,181

(22) Filed: Nov. 18, 2017

(65) Prior Publication Data

US 2019/0095470 A1 Mar. 28, 2019

Related U.S. Application Data

(60) Provisional application No. 62/561,680, filed on Sep. 22, 2017.

(51) Int. Cl.
*G06F 16/00* (2019.01)
*G06F 16/21* (2019.01)
(Continued)

(52) U.S. Cl.
CPC .......... *G06F 16/217* (2019.01); *G06F 11/079* (2013.01); *G06F 11/0727* (2013.01); *G06F 11/0793* (2013.01); *G06F 16/245* (2019.01)

(58) Field of Classification Search
None
See application file for complete search history.

(56) References Cited

U.S. PATENT DOCUMENTS

| 7,356,526 B2 | 4/2008 | Gao et al. |
| 7,526,409 B2 | 4/2009 | Ramacher et al. |

(Continued)

OTHER PUBLICATIONS

"Oracle Enterprise Manager 13c Cloud Control", Retrieved From <<http://download.robotron.de/pdf/oracle/ds-diagnostics-pack-db12c-1964641_2.pdf>>, Retrieved on: Jun. 28, 2017, pp. 1-5.

(Continued)

*Primary Examiner* — Anhtai V Tran
(74) *Attorney, Agent, or Firm* — Fiala & Weaver P.L.L.C.

(57) ABSTRACT

Database systems are subject to automatic troubleshooting. Query execution data for individual queries executed by a database system can be collected. The query execution data can be evaluated automatically in conjunction with one or more detection metrics to determine whether or not a potential performance issue exists. After detection of a potential issue, the query execution data can be analyzed further to determine one or more causes by matching query execution data to one or more patterns that encode candidate causes. Subsequently, a root cause amongst multiple causes is determined based on causal dependency. Corrective action associated with a root cause can also be determined and optionally applied automatically.

20 Claims, 11 Drawing Sheets

(51) Int. Cl.
*G06F 11/07* (2006.01)
*G06F 16/245* (2019.01)

(56) References Cited

U.S. PATENT DOCUMENTS

| | | |
|---|---|---|
| 7,664,798 B2 | 2/2010 | Wood et al. |
| 7,673,291 B2 | 3/2010 | Dias et al. |
| 8,903,801 B2 | 12/2014 | Belknap et al. |
| 8,924,790 B2 | 12/2014 | Huang et al. |
| 8,943,198 B2 | 1/2015 | Lukas et al. |
| 9,015,188 B2 | 4/2015 | Behne |
| 9,027,025 B2 | 5/2015 | Zoll et al. |
| 2005/0055673 A1* | 3/2005 | Dias ............... G06F 16/217 717/127 |
| 2009/0077016 A1* | 3/2009 | Belknap ............ G06F 16/24542 |
| 2009/0100004 A1* | 4/2009 | Andrei ............. G06F 16/24542 |
| 2010/0312776 A1 | 12/2010 | Burrichter et al. |
| 2011/0161310 A1 | 6/2011 | Tang et al. |
| 2016/0314056 A1 | 10/2016 | Greene et al. |
| 2017/0123890 A1 | 5/2017 | Haridas et al. |

OTHER PUBLICATIONS

"Indexing Tool : Missing Index Dynamic Management Objects (DMO)", Retrieved From <<https://curryncode.com/2016/09/26/indexing-tools-for-microsoft-sql-server/>>, Sep. 26, 2016, 10 pages.

* cited by examiner

AUTOMATIC DATABASE TROUBLESHOOTING

CROSS-REFERENCE TO RELATED APPLICATION

This application claims the benefit of U.S. Provisional Application No. 62/561,680 filed Sep. 22, 2017, the entirety of which is incorporated herein by reference.

BACKGROUND

Database systems have evolved into large and sometimes complex pieces of software. These systems enable customers to write arbitrarily complex logic, which may result in applications that perform poorly. Problems are typically resolved through a combination of good database design choices during development and troubleshooting by database administrators. Larger and more complex systems often require greater administrator expertise to debug and tune. In light of application differences, manual tuning by database administrators is often required to effectively manage such systems to keep applications performing adequately.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to automatic database troubleshooting. A performance issue, such as regression of performance as compared to previous behavior, can be detected automatically by evaluating one or more detection metrics with query execution data collected for individual queries executed by a database system. Detection of a performance issue can trigger further analysis to identify one or more categories, or causes, by matching query execution data to one or more patterns that encode candidate causes. Identified causes can be subsequently refined by determining causal dependency amongst multiple causes and identifying the root cause based on the causal dependency. The root cause can then be classified, for example as a system issue, an application issue, or an unclassified issue. Corrective action associated with the root cause can also be determined and optionally automatically applied.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
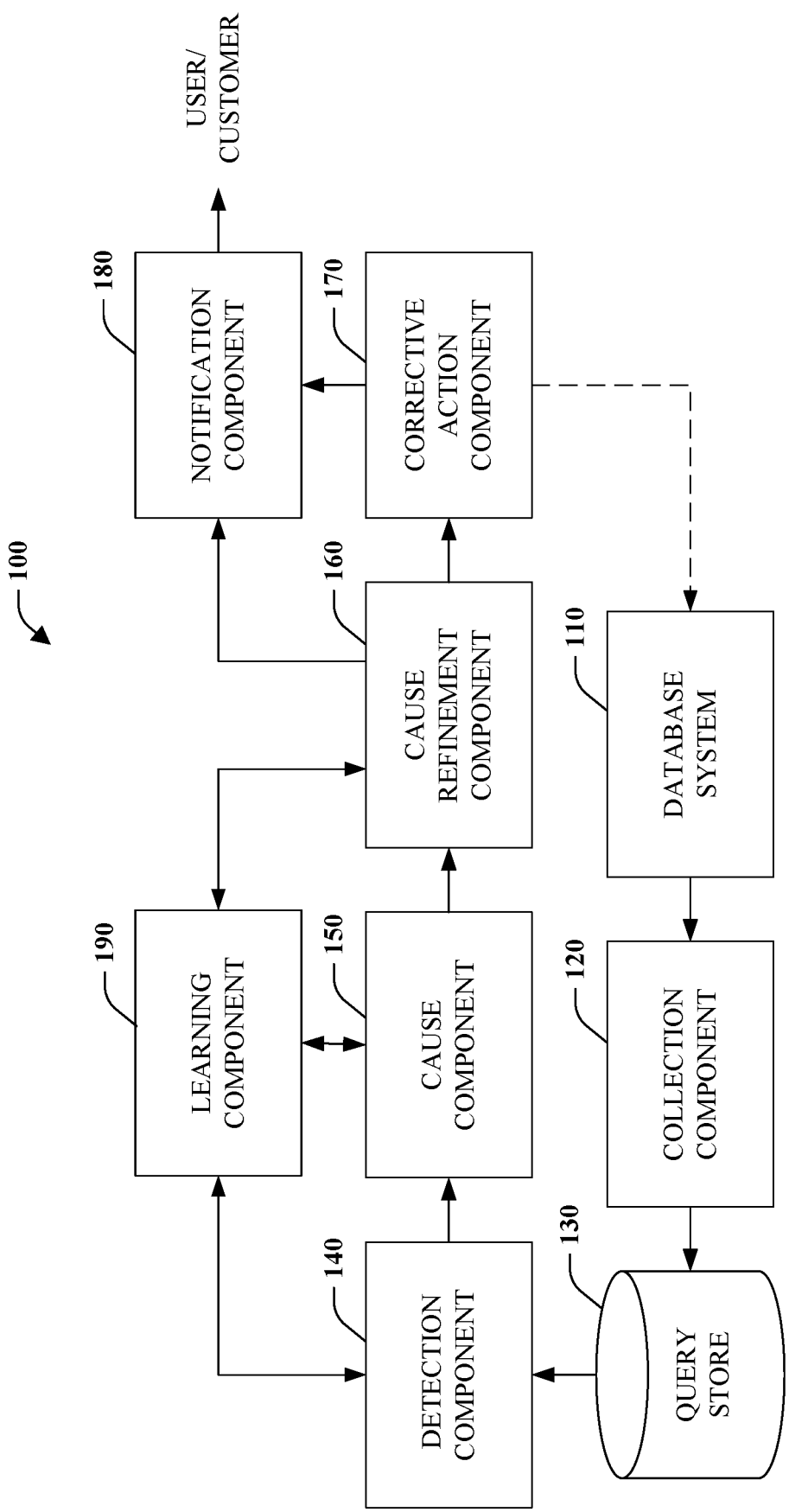
FIG. 1 is a block diagram of a database troubleshooting system.

Recent industry innovations have changed part of the workflow associated with troubleshooting a database system. First, public clouds have evolved to provide computing resources to the general public over the Internet thereby allowing customers to rent standardized hardware instead of purchasing hardware. Rental of hardware reduces impediments to building or deploying a new application using a database, but abstracts elements of hardware often used by administrators when performance tuning. Second, network-based services, sometimes called platform as a service, or PaaS, have emerged that attempt to remove the need for a database administrator. These services allow customers to purchase compute or database capacity on-demand and to have more flexibility in how customers spend money to run their businesses. Third, there has been an evolution in how independent software vendors (ISVs) deploy software. In the past, ISVs deployed individual copies of an application in an on-premises environment that communicated with an on-premises database server. ISVs have now moved toward a different model in which they host a combined software service that works for their customers collectively in a public cloud environment using PaaS services instead. ISVs did not use this model previously because it was too expensive to manage all the hardware themselves, but now they can acquire public cloud providers to do that for them. Furthermore, the database administrator cost was previously borne by the end customer and is now expected from the cloud service provider since PaaS services often include performance tuning and troubleshooting as part of the expectation of that service.

There are a few existing solutions, which provide advanced monitoring support through a set of user interfaces that allows a database administrator to monitor and investigate the behavior of a database. These solutions focus on empowering database administrators or consultants to help manage the performance of a single system or small set of similar systems. However, many performance problems are beyond the skill of an average database administrator, and when scaling limits are hit or load increases beyond a threshold, applications can fail, resulting in significant business loses for users of these applications. Even for highly skilled database administrators, it can take hours or longer to identify problems and deploy fixes. Furthermore, existing techniques break down when applied to the massive scale of public-cloud database hosting systems with millions of databases and applications hosted on the same infrastructure. It is impractical to have enough trained performance experts to handle complex problems when systems are centralized. As such, none of the existing technologies apply effectively at the scale of a cloud service.

Details below generally pertain to automatic database troubleshooting. Knowledge and experience of a highly skilled database administrator can be captured in a system or process that replicates such an administrator's train of thought regarding anomaly detection and cause identification thereby providing intelligent insight automatically with respect to database troubleshooting. More particularly, query execution data can be collected for individual queries executed by a database system. The query execution data can be evaluated utilizing one or more detection metrics to automatically detect the existence of at least a potential performance issue, such as a performance regression. Detection can trigger further analysis to identify one or more causes by matching query execution data and other database level data to one or more patterns that encode candidate causes. Identified causes can be subsequently refined by determining causal dependency amongst multiple causes and identifying the root cause based on the causal dependency. The root cause can then be classified based on responsibility, for example as a system issue, an application issue, or an unclassified issue. Corrective action associated with the root cause can also be automatically determined and optionally applied. In addition to self-healing or self-tuning by way of the corrective action, self-learning can be employed based on historical values and evolution over time.

Automatic database troubleshooting is beneficial at least in that performance issues can be detected and handled proactively and skillfully without human intervention. Further, automatic database troubleshooting is conducive to employment at scale across a large number of databases including in a cloud-hosted database system.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Referring initially to FIG. 1, a database troubleshooting system 100 is illustrated. The database troubleshooting system 100 is configured to automatically and proactively monitor database usage and detect issues that negatively affect performance. After detection of such a performance issue, analysis can be performed generating intelligent insight into the detected issue including the root cause of the performance issue detected and a recommended corrective action. In this manner, the database troubleshooting system 100 is directed to the technical problem of resolving database system performance issues including large scale network-based systems. The database troubleshooting system 100 includes database system 110, collection component 120, query store 130, detection component 140, cause component 150, cause refinement component 160, corrective action component 170, notification component 180, and learning component 190.

The database system 110 enables data storage, processing, and access with respect to a database and can include database engines of various types. The database system 110 can operate with respect to a variety of different types of data including relational and non-relational. Further, the database system 110 can be implemented on an on-premise server, or as a network-accessible service (e.g. cloud service). The database system 110 is illustrated as a single database system for simplicity. However, the database system 110 can correspond to numerous database systems hosted by a database service. In fact, such a database service is subject to massive scale, for example hosting millions of databases on the same infrastructure.

The collection component 120 is configured to collect data with respect to execution of individual queries by the database system 110. More specifically, collection component 120 can acquire information about query execution such as but not limited to execution plans, including history, and runtime information, among other things. For example, the collection component 120 can acquire execution metrics such as central processing unit time, duration, execution count, reads, writes, and memory consumption as well as statistics regarding data such as average, maximum, minimum, total, and standard deviation. Further, the collection component 120 can acquire information about the time or time windows during which the data is collected to facilitate comparison for identifying performance divergences. The collection component 120 can be configured to operate continuously, periodically, or as requested with respect to all queries or a subset thereof (e.g., repeated or sizeable queries). The collected data can be stored in the query store 130, a non-volatile computer-readable storage medium, for subsequent access and processing. Although illustrated separately, in another embodiment the query store 130 can reside on a database within the database system 110 and generated by a collection component 120 executed by the database system 110.

The detection component 140 is configured to detect performance issues or problems. The detection component 140 is operably connected to at least the query store 130, and can request and receive query execution data from the query store 130. The detection component 140 can utilize query execution data as well as other database level data as the basis for determining whether or not a performance issue exists. For example, various execution metrics can be computed with the query execution data and database data to determine whether or not a performance issue exists. These metrics can seek to encode anomaly detection and pattern recognition abilities of a highly skilled database administrator or consultant adding intelligence to the detection functionality. Further, the detection component 140 can be executed constantly or periodically to proactively detect performance issues in near real time before the performance issue is noticed by a database customer.

In one instance, the performance issue can be performance regression. Over time, performance of a database can degrade potentially to the extent it becomes noticeable to end-users. In this context, the detection component 140 can compare database usage at different times. Usage is comprised of queries executed by the database, wherein the most impactful queries are those queries that are repeated or sizeable. Each database is unique based on its structure, data, usage, and application. Consequently, a baseline can be generated that is specific to a database, for example based on a previous day or week of data. Usage captured by the query execution data of a period of interest can be compared with the baseline to determine whether issues with query duration, timeout, wait time, or error, for example, negatively affect performance to an extent that qualifies as a performance issue or at least the potential of a performance issue. If sufficient data has not been collected for baseline comparison to past performance or for other reasons, absolute criteria can be utilized rather than relative criteria such that a performance issue is detected if query performance data exceeds or falls below a predefined threshold.

If a performance issue is detected, by the detection component 140, the cause component 150 can be notified, or, in other words, triggered. As such, the detection component 140 acts as an initial filter or gateway to performance of additional analysis. Further, efficient processing is enabled since additional analysis is confined to detection of a performance issue or the likelihood of a performance issue.

After a performance issue is detected by the detection component 140, the cause component 150 can automatically determine one or more causes of the performance issue. At this point, analysis of the cause component 150 can drill deeper into performance data to determine what worsened compared to previous behavior, for instance. This analysis can be performed automatically by matching query execution data to a detectable pattern of a plurality of detectable patterns that encode candidate causes. For example, one pattern can correspond to memory pressure which can be detected in situations when queries running on the database are waiting for a longer period of time. Stated differently, the cause component 150 can categorize or classify a performance issue as having a particular cause. Further, the cause determined by the cause component 150 is a current cause and not necessarily a root cause. For example, queries can be currently slow because there is high central processor consumption on the database. However, high processor consumption could have resulted from one or more other causes.

Subsequently, the cause refinement component 160 can be invoked to refine the cause. The cause refinement component 160 can take a time dimension as input and combine that with causes determined by the cause component 150. The cause refinement component 160 can then determine a causality chain between multiple determined causes based on timing properties and predefined rules capturing knowledge and experience of a skilled database administrator. The root cause, or actual cause, of the performance issue can then be determined based on the causality chain, or, in other words, dependencies between causes.

For clarity and understanding, consider a scenario in which the current cause of a performance issue, such as a regression, identified by the cause component 150 is high central processing unit (CPU) consumption. The cause refinement component 160 can essential look back in history and try to determine what caused this high CPU consumption. For example, the high CPU consumption could have been caused by one query that became very expensive on the CPU, and this happened because some time ago this query had a plan regression, and plan regression occurred because a bad index was created for this query. The root cause in this case is not high CPU consumption but rather a bad index.

In one instance, the root cause identified by the cause refinement component 160 can correspond to an issue library category or class for which the cause is categorized or classified. The root cause can be a more general cause than that determined by the cause component 150. For example, clustering can be employed to group causes with similar patterns determined by the cause component 150 into groups with the same root causes. Based on the determined issue, the cause refinement component 160 can also classify the performance issue in terms of responsibility, for instance as a system issue (e.g., caused by the database system), application issue (e.g., caused by customer application), or unclassified issue (e.g., unknown).

The corrective action component 170 is configured to determine and apply a corrective action to the database system 110. In one instance, the corrective actions can be encoded with the causes such that a final determination on the cause includes actions that will mitigate or correct a performance issue. However, other implementations are also possible to enable determination of the corrective action. Once determined, the corrective action can be applied to the database system 110. For example, a bad index can be dropped in response to determination that a bad index was the root cause of a performance regression.

The notification component 180 is configured to provide notification of the result and insight acquired by troubleshooting to responsible actors based on classification (e.g., system, application . . . ). In one instance, a log can be created and forwarded for display on a display device. The log could comprise various details such as identification of a database, start and end time of the period of detected insight, range of impacted metrics triggering the analysis, determined cause during the time of an event, and root cause. The log can also include corrective action acquired from corrective action component 170. In this manner, correction can be reviewed and triggered manually if desired to tune performance of a database.

The learning component 190 is a mechanism that enables self-learning without human intervention. Functionality regarding detection, cause determination, and cause refinement can be updated over time based on input and learning algorithms. In a simplified example, if the detection component 140 detects a performance issue that turns out not to be a performance issue upon further analysis, the rules, metrics, or models of the detection component 140 can be updated so as not to recognize the same or similar conditions as a performance issue. As another example, the learning component 190 can analyze categories or patterns for similarity and the same root cause and corrective action and deduce new categories or patterns. In another instance, if a current issue is similar enough to any existing issues, the learning component 190 can assign the same root cause and corrective action and determine whether the corrective action cures a performance issue. In yet another example, self-learning can be performed by applying various corrective actions to performance issues unseen before and trying to determine which corrective action works best. After determining an optimal corrective action, a new rule can be added for cause refinement such that the same or similar issues in the future will apply the same corrective action to cure the issue.

Figure 2:
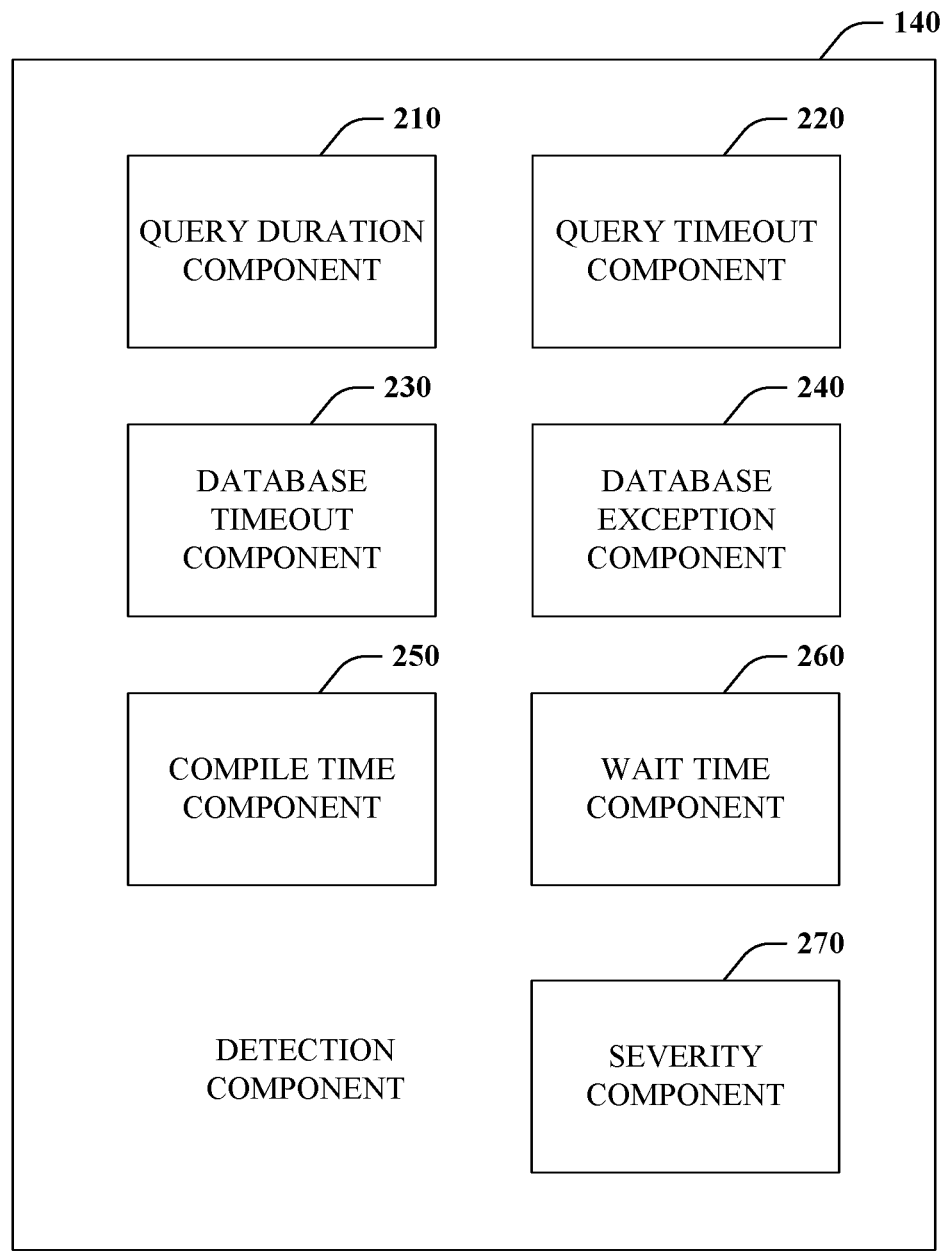
FIG. 2 is a block diagram of an exemplary detection component.

FIG. 2 depicts an exemplary detection component 140 in further detail. As noted above, the detection component 140 can detect performance issues. In one instance, the detection component 140 proactively detects a performance issue or anomaly before end-users notice a negative impact. The detection component 140 includes a number of components configured to evaluate query performance data and identify at least potential performance issues based on detection metrics and comparison to an absolute or relative threshold. For example, a metric can be compared to a metric specific threshold to determine the existence of a performance issue. Alternatively, evaluation of the performance of queries can be accomplished with respect to a time window (e.g., 60 minutes) over a period of time (e.g., a few days) and compared to a change threshold that indicates regression from prior values. As shown, the detection component 140 includes query duration component 210, query timeout component 220, database timeout component 230, database exception component 240, compile time component 250, and severity component 270.

The query duration component 210 can detect regressions of an executed query in a database based on elapsed time to compile and execute a query. The elapsed time of a query during a baseline period can be compared with a current period. Although not limited thereto, in one instance, the comparison can be confined to important queries, wherein important queries are defined based on extent of execution, for instance, in terms of number of times a query is executed, or the fraction of execution time occupied by execution of a query. For example, an important query can be defined as one that was executed at least twenty-five percent of the time during one-hour intervals or has at least one hundred executions since it first appeared and there is at least one day of baseline data. In one implementation, the query duration component 210 can execute a test for a query to detect a significant change between two intervals with a 99% statistical significance (p-value <0.01). Hard limits can also be defined where relative change of average lapsed time should be more than 50% and an average elapsed time in a current interval no longer than 100 milliseconds, or mathematically:

$$\frac{(\overline{elapsed\_time}_{current} - \overline{elapsed\_time}_{baseline})}{\overline{elapsed\_time}_{baseline}} > 0.5, \text{ where}$$

$$\overline{elapsed\_time}_{current} > 100 \text{ ms and } p_{value} < 0.01.$$

The query timeout component 220 can detect regression based on individual query timeouts, wherein a query times out, in accordance with a predetermined time lapse, before it is executed. A query timeout ratio of queries can be compared during a baseline period and the current period. For each time period (e.g., 15 minutes) for each query, a ratio of timeout count and query execution count can be calculated as the timeout ratio. Further, average and standard deviation of the timeout ratio can be computed. A comparison can then be made between the timeout ratio from the last hour, for example, with the baseline. If the current ratio is more than three standard deviations away from the baseline average, this can be considered a regression, or mathematically:

$$\frac{(\overline{timeout\_ratio}_{current} - \overline{timeout\_ratio}_{baseline})}{\sigma(\overline{timeout\_ratio}_{baseline})} > 3$$

The database timeout component 230 can detect regression based on timeout queries, which time out before they even reach the execution stage. A comparison can be made between aborted workers per total number of requests ratio during the baseline period and the current period. For each time period (e.g., 10 minutes), a ratio of the number of aborted workers versus number of requests is calculated as the aborted ratio. Average and standard deviation of the aborted ratio from the baseline can also be computed. A comparison can then be made between the aborted ratio from the last hour, for instance, with the baseline. If the current ratio is more than three baseline standard deviations away from the baseline average, a regression can be deemed to have occurred, or mathematically:

$$\frac{\left(\overline{aborted\_workers\_per\_request}_{current} - \overline{aborted\_workers\_per\_request}_{baseline}\right)}{\sigma(\overline{aborted\_workers\_per\_request}_{baseline})} > 3$$

The database exception component 240 can detect regression based on the number of new exceptions or errors. A comparison can be made between the number of exceptions per number of requests ratio during the baseline period and the current period. For a time period (e.g., 10 minutes), the ratio of number of exceptions versus number of requests is computed as the exception ratio. Average and standard deviation of the exception ratio from the baseline can also be computed. A comparison can be made between the exception ratio from the last hour, for example, with the baseline exception ratio. If the current ratio is more than three baseline standard deviations way from the baseline average, it can be considered a regression, or mathematically:

$$\frac{(\overline{exceptions\_per\_requests}_{current} - \overline{exceptions\_per\_requests}_{baseline})}{\sigma(\overline{exceptions\_per\_requests}_{baseline})} > 3$$

Further, the calculation can be done per exception code, that is for each group of exceptions of the same type, as opposed to all exceptions on a database bundled together.

The compile time component 250 can detect regression based on individual query compile time regressions. Query compile time of queries during the baseline period and the current period can be compared. Query compile time statistics can be computed for each query for baseline and for the current period. Such statistics can include average compile time, variance of compile time, and execution count. Query executions that were not recompiled are considered as a compile time equal to zero. A test can be run for a query to detect a significant change between the two intervals with ninety-nine percent statistical significance (e.g., p<0.01). Limits can also be defined where relative to change of average compile time is no more than fifty percent, and average compile time in a current interval is no more than one hundred milliseconds, or mathematically:

$$\frac{(\overline{compile\_time}_{current} - \overline{compile\_time}_{baseline})}{\overline{compile\_time}_{baseline}} > 0.5, \text{ where}$$

$$\overline{compile\_time}_{current} > 100 \text{ ms and } p_{value} < 0.01.$$

The wait time component 260 is configured to detect performance issues associated with an increase in time a query is waiting during its execution life. Any of the following metrics can be monitored that independently or combined my affect query execution wait time: reaching resource limits, reaching worker limits, reaching elastic pool resource limits, reaching session limits, page latch contention, excessive database locking, memory pressure, and unusual wait statistics. Thresholds for reaching the wait time limits for these metrics can be managed.

Subcomponents of detection component 140 can implement various data science models each of which observes a statistic whose deterioration can result in a performance issue. The aforementioned subcomponents have been described with respect to relative models. However, they can also implement absolute models. Relative models capture performance deteriorations compared to previous behavior, whereas absolute models capture bad performance for new databases, for example. Further, absolute models can serve as general backup to relative models, capturing bad performance not captured by relative models due to various limitations or thresholds embedded in their definitions (e.g., twenty five percent of time queries, fifty percent relative change, and at least one day of baseline data). These data science models can be run at a defined interval such as every fifteen minutes and can check millions of different queries for a performance issue. Upon detecting a performance issue, such as regression, a cause of the issue can be determined.

The severity component 270 provides a mechanism to determine and assign a degree of severity to a detected performance issue. The degree of severity can be employed in conjunction with providing notification of a performance issue. For instance, the severity of performance issue can drive a decision as to whether or not to provide notification. Further, degree of severity can be a factor in whether or not further processing should be performed to determine a cause. The severity component 270 can also include a mechanism to prioritize specific regressions within a single database or database server. Since different quantities (e.g., number of exceptions, timeouts, query duration . . . ) are being compared, each metric can be calculated in a different way. For the metrics to become comparable between each other, the metrics can be normalized into a generic metric that allows cross issue prioritization. Table 1 below shows the how a generic metric can be computed for each type of metric for comparison purposes.

Table 2 below provides one exemplary implementation of a range of severity values as well as associated comments regarding degree, significance, and potential action with respect to performance regression.

TABLE 2

| Severity | Comment |
| --- | --- |
| 0 < Sev <= 1 | Not considered a regression. Not propagated to cause component 150 for further processing |
| 1 < Sev <= 6 | Low Severity Regression, mostly transient issues not noticeable by the customer |
| 6 < Sev < 100 | Medium Severity Regression, transient issue which may be noticeable by the customer if it is a "single point of failure" database |
| 100 <= Sev < 1000 | High Severity Regression, mostly transient issues noticeable by the customer |
| Sev >= 1000 | Very High Severity Regression, large, oftentimes non-transient issue on customer database heavily impacting performance of the application |

Figure 3:
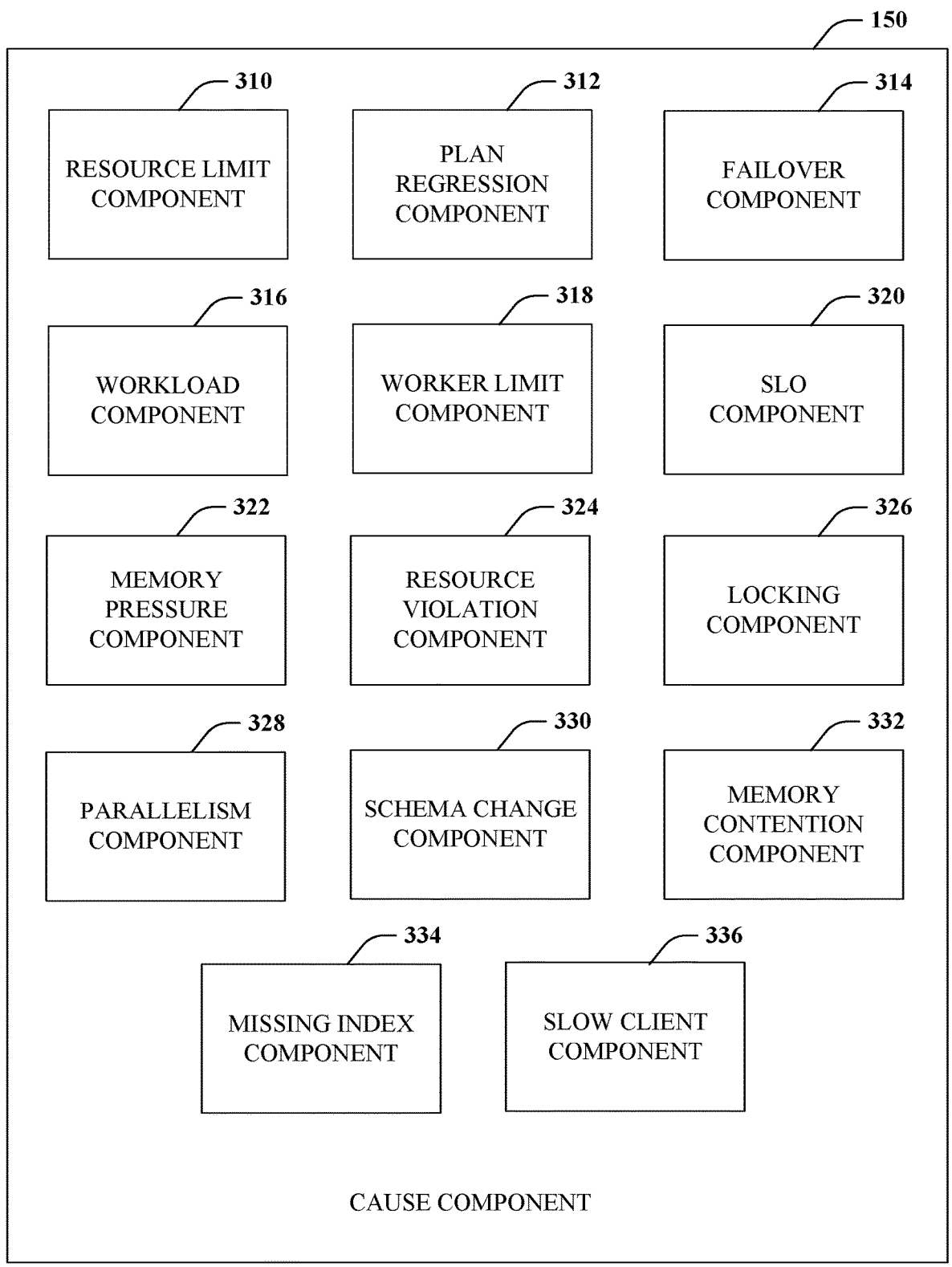
FIG. 3 is a block diagram of an exemplary cause component.

FIG. 3 illustrates an exemplary cause component 150 in further detail. The cause component 150 can determine one or more causes of a performance issue, or potential performance issue, by matching query execution data to a pattern of a plurality of patterns that include candidate causes. In furtherance thereof, the cause component 150 can employ a plurality of different components or models to detect a current cause of a performance issue. What follows is a description of a set subcomponents of the cause component 150 that can be employed to identify one or more causes of a performance issue. The subcomponents are exemplary and only a subset of potential subcomponents that could be utilized to detect causes of performance issues are illustrated.

TABLE 1

| | |
| --- | --- |
| Query Duration | Minutes of regression time of all queries detected as regressed in the current period: $$\sum_{regressed\ queries} \overline{\text{execution\_time}}_{baseline} - (\overline{\text{elapsed}_{time}}_{current} - \overline{\text{elapsed}_{time}}_{baseline})$$ |
| Timeouts Query Level | Minutes of execution time per hour that were wasted by queries whose timeout ratio was flagged as being significantly increased: $$\sum_{queries\ with\ more\ timeouts} \text{execution\_time}_{baseline} \cdot \overline{\text{elapsed\_time}}_{baseline}$$ |
| Timeouts Database Level | $$\min\left(\frac{1}{10} \cdot \frac{(\overline{\text{aborted\_workers\_per\_request}}_{current} - \overline{\text{aborted\_workers\_per\_request}}_{baseline})}{\max(\sigma(\overline{\text{aborted\_workers\_per\_request}}_{baseline}), 0.001)}, 99\right)$$ |
| Exception | $$\min\left(\frac{1}{10} \cdot \frac{(\overline{\text{exceptions\_per\_batch}}_{current} - \overline{\text{exceptions\_per\_batch}}_{baseline})}{\max(\sigma(\overline{\text{exceptions\_per\_batch}}_{baseline}), 0.001)}, 99\right)$$ |
| Compile Time | Minutes of regression time of all queries detected as regressed in the current period: $$\sum_{regressed\ queries} \overline{\text{execution\_time}}_{baseline} - (\overline{\text{compile\_time}}_{current} - \overline{\text{compile\_time}}_{baseline})$$ |

Resource limit component 310 identifies a situation in which consumption of database system resources (e.g., CPU, I/O, logs . . . ) has reached limits that are causing queries to wait for resources to become available. Consequently, performance regression in query execution time results. To improve performance in the case where resource limits are reached, optimization of workload volumes, queries, indexes, and even applications could be performed. Further, an increase in pricing tier may be considered to increase resources available.

Plan regression component 312 identifies a state in which a database system starts using a sub-optimal query plan to execute queries. The sub-optimal query plan can cause query executions to consume more resources leading to longer wait times for that and other queries. This pattern can be recognized in at least two cases. A first case is when a new plan regression is detected causing statistically significant performance regression compared to a previously measured period. A second case is when a change in workload affects the current plan to perform sub-optimally causing a statistically significant performance degradation compared to a previously measured period. In order to troubleshoot this issue, selection and use of a plan deemed most optimal for execution of queries can be forced.

Failover component 314 detects when a database in a cloud service changes a hosting node or machine. There are numerous reasons why a failover can happen, but it often causes a performance degradation since once started on a new node a database is working in cold-start mode without preloaded data in memory.

Workload component 316 detects cases where regressions are caused by a change in the workload. For example, a workload-increase manifests in increased number of requests. As another example, a workload pileup is revealed in increased number of timeouts.

Worker limit component 318 identifies cases where a database in a cloud service hits a limit number of active threads that can be executed in parallel. This means there is a bounded number of active threads that can be executed in parallel. Once the limit is hit, new worker threads will be starved and waiting statistics will increased.

Service level objective (SLO) component 320 identifies situations where changes in service level objective affect performance. In a downgrade situation, a database is being resized to a lower size with less resources. In an upgrade situation, a database is being resized to a higher size with more resources. In both situations there can be an impact on performance due to the downgrade or upgrade operations. Further, with respect to downgrade, this affects workload since it now has less resources to use for execution.

Memory pressure component 322 detects performance degradation that occurs due to high memory utilization. More particularly, the memory pressure component 322 detects situations in which queries are waiting for memory for a longer period of time than a baseline time. For example, worker threads requesting memory grants can be determined to wait for memory allocations for statistically longer periods of time. In another instance, when newly executed queries requesting memory form grants is higher than the number of queries releasing memory during a period of time, memory pile-up occurs. In both cases, detection can be based on memory statistics. Queries waiting for memory may create a bottleneck on memory, increasing related wait times thereby degrading performance.

Resource violation component 324 detects a situation in which a system does not have in enough resources in a period of time while the resource limits are not being hit in the same period of time. This can occur due to various system issues and can cause workload and, in the end, query regressions for a database. If the size of a regression corresponds to the size of regressions that happen for a particular resource like central processing unit or input/output, the regression can be deemed a resource violation by the resource violation component 324.

Locking component 326 identifies regressions that happen due to some new or unexpected locks in a database. More particularly, the locking component 326 can identify cases in which customer workload, such as queries, are accessing the same database resource in a way that causes locking. If new query is being run and added to the workload, locking can happen, or if there is an increase in the workload, locking can happen as a consequence as well. Detection can involve measurement and analysis of locking related waiting statistics such as locking time, observed interval, and baseline. If an observed value is greater than some predetermined value (e.g., 50%) compared to the baseline, the regression case can be deemed an issue caused by locking.

Parallelism component 328 concerns analysis of parallelism of a query plan. Due to imperfection of a query optimizer, a plan can be chosen for executing a query that is parallelized more than it should. In this case, a number of worker threads are scheduled to process the query, each of the worker threads spending time waiting on each other to synchronize and merge results. The result is additional waiting, longer query execution, and regression. To detect parallelism exceeding a maximum degree, central processor related waiting statistics can be measured. If an observed value is greater than a predetermined threshold (e.g., 50%) compared to the baseline, and there is an increase of a predetermined degree of parallelism (e.g., 1.25 times) for a query, the cause can be deemed parallelism or more specifically exceeding a maximum degree of parallelism.

Schema change component 330 detects a change in data schema on the customer side that cause recompilation of the queries. Recompilation itself may cause queries to run slower many reasons. Such a determination can be made by tracking events that answers two questions, was the query recompiled and was the cause of recompilation was change in schema. If the answer to these two questions is in the affirmative, the performance issue can be deemed a schema change.

Memory contention component 332 detects contention for memory in which an application competes for memory. Consider, for example, an application that issues queries that access the same database resource on a page level. In one instance, memory contention can be detected with page access related waiting statistics. If the observed value is greater than a predetermined value (e.g., 50%) compared to a baseline, the cause can be categorized as a memory contention.

Missing index component 334 identifies a situation in which the lack of a database index results in a performance issue such as regression. This can be the case, for example, if a customer application workload issues queries that are accessing the same non-indexed database resource and as a result data needs to be read from disk. To detect this, data access related waiting statistics are measured. If the observed value is greater than a predetermined value (e.g., 30%) compared to the baseline, and there is a missing index detected by the existing model inside of the database, this regression case can be categorized as a performance issue caused by missing index.

Slow client component 336 detects a situation in which database output is being consumed slowly. This can be the result of a client application slowly consuming results provided by a database or when there are issues with network throughput between a client application and the database. To detect this, network related waiting statistics are measured. If the observed value is greater than a predetermined value (e.g., 50%) compared to a baseline this regression case can be deemed to have been caused by a slow client.

In the above set subcomponents of the cause component 150 regression is specified in terms of percentage of wait time increase. It should also be appreciated that an additional condition can be embedded within a least a subset of the set of subcomponents, namely contribution to the regression itself. For example, the locking wait times can increase by more than fifty percent, but these increased locking waits themselves may account for only a small fraction of total wait time a query is experiencing, and thus may not be considered a reason for regression in this case. In other words, main contributors to regression can be sought. The main contributors can account for more a predetermined percentage of regression (e.g., thirty percent). Further, the predetermined percentage can vary based on components/causes. For example, the percentage can be thirty percent for most components, but slow client requires to more than ninety percent of total wait time to be deemed a main contributor.

Figure 4:
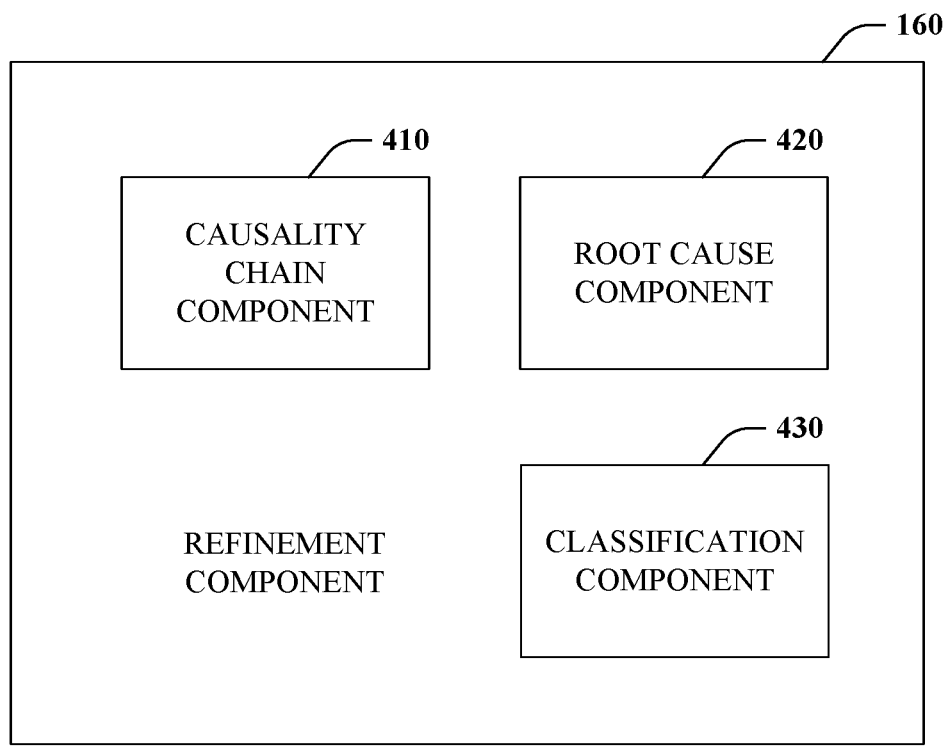
FIG. 4 is a block diagram of an exemplary cause refinement component.

FIG. 4 shows an exemplary cause refinement component 160 in detail. The cause refine component 160 refines the cause of a performance issue producing a root or actual cause. In furtherance thereof, the cause refinement component 160 includes causality chain component 410, root cause component 420, and classification component 430. The causality chain component 410 can utilize predefined rules and time properties associated with detected causes including when an incident originated and the duration of the incident to determine dependencies amongst detected causes. Based on the causality or dependency, the root cause component 420 can identify the root cause for a performance issue by selecting the head or root of the causality chain produced by the causality chain component 410. The classification component 430 can then classify the root cause as a system issue, application issue, or unclassified issue. The root cause is a system issue if it matches an issue considered to be caused by the system. Conversely, the root cause can be deemed an application issue if the cause matches an issue considered to be cause by an application. Finally, if the root cause does not match any known system or application issues, the cause is an unclassified issue.

In accordance with one non-limiting implementation, cause component 150 and the cause refinement component 160 can be implemented as an expert system that captures a database administrator's knowledge and thought process with data models and rules. The detection component 140 can provide a screening mechanism to detect an abnormal condition prior to triggering diagnosis or troubleshooting by way of the expert system. However, the detection component 140 can also generate data that may be useful for later classification. Further, the expert system can implement multistage hierarchical classification or categorization. For example, the detection component 140 can form a first stage in which a performance abnormality such as a regression is detected based on data observed regarding the database system 110 and classified based on severity. The cause component 150 can perform a second stage of categorization of a detected performance issue or potential performance issue based on further analysis of data observed regarding the database system and detectable patterns or models of causes. For example, the expert system can specify a number of rules with respect to how a performance issue is to be categorized a function of data associated with database performance. Finally, the cause refinement component 160 can perform super-categorization of the detected causes based causal dependencies, wherein one or more causes are ascribed to a super category, which is a more general category than the category specified by the cause component 150. Further, categories can include corrective action such that categorization also includes identification of a corrective action.

Returning briefly to the notification component 180 of FIG. 1, the notification component 180 can generate a performance diagnostic log that captures insights of performance analysis for use in presenting such information to a user. There can be a few parts of the log including header, issue identifier, categorization and metrics of issues detected, queries affected by the issues detected, detected performance issues, root cause and improvement recommendations. The header can include a time when the entry was created including resource identification (e.g., particular database in cloud service), category, and level. The issue identifier identifies time span during which a performance issue occurred. The categorization and metrics of issues detected includes information regarding a performance issue categorization (e.g., increase in query duration, error count, waiting time . . . ) as well as metrics that lead to the categorization (e.g., duration, error count, cumulative value . . . ). The queries affected by the issues detected portion of the log can identify particular queries that are affected by performance issues. The detected performance issues portion can identify detected performance issues as well as their impact. The root cause analysis and improvement portion of the log includes the result of root cause analysis (e.g., in human-friendly verbiage) of a performance issue as well as improvement recommendations based on the root cause.

Further, based on the class (e.g., customer, system, unknown . . . ) a detected cause can be exposed in different ways. Customer issues, for instance, can be exposed to an end-user of a database through a communication channel chosen by the customer previously as the most efficient channel where the user wants to receive this kind of root cause analysis. Examples of communication channels includes a cloud service portal, email address, or phone number. In situations where a corrective action is identified for a detected performance issue, the corrective action can be applied in order to optimize workload and resolve the detected problem. For example, the regression which is caused by a missing index in a database can be automatically fixed by adding the index. System issue can be processed differently than customer issues. In one instance, system issues can be transferred to an appropriate engineering team responsible for a particular component or sub-component which is the root cause of a performance issue. In a case where the solution to a problem is automated, corrective action is applied in order to fix the issue as soon as possible and reduce the negative impact on customer workload. If a cause is classified as unknown or error, these causes can also be transferred to an engineering team responsible for research, development, and improvement of the system.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. For example, components 120-170 of the database troubleshooting system 100 can be components or execute associated functionality included in the database system 110. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example, and not limitation, the learning component 190 can employ such functionality to learn and update other components. Additionally, the detection component 140, cause component 150, and cause refinement component 160 can be implemented as a knowledge or rule-based components that detect a performance issue and infer the root cause of the performance issue.

In view of the exemplary systems described above, methodologies that may be implemented in accordance with the disclosed subject matter will be better appreciated with reference to the flow charts of FIGS. 5-10. While for purposes of simplicity of explanation, the methodologies are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter.

Figure 5:
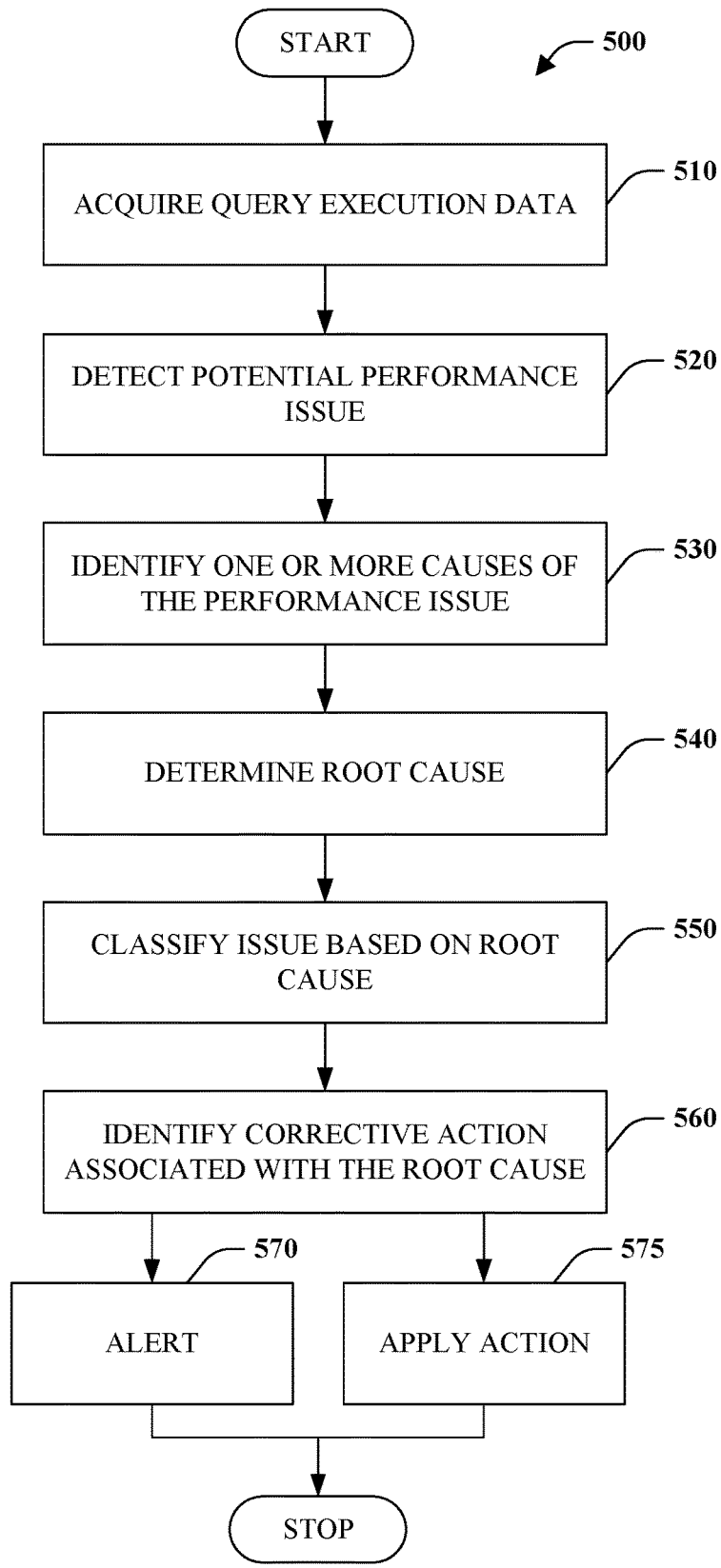
FIG. 5 is a flow chart diagram of a method of database troubleshooting.

Referring to FIG. 5, a method of database troubleshooting 500 is illustrated. At reference numeral 510, query execution data is acquired. Query execution data comprises data pertaining to execution of individual queries by a database system. For example, query execution data can include execution plans, including history, and runtime information, central processing unit time, duration, execution count, reads, writes, and memory consumption, among other things. The query execution data can be received, retrieved, or otherwise obtained or acquired from a query store.

At numeral 520, a potential performance issue is detected based on analysis of the query execution data. Various data models indicative of a potential performance issue can be evaluated with the query execution data to detect the performance issue. By way of example, and not limitation, detection data models can measure query and database level data regarding query duration, timeout requests, excessive wait time, and errored requests. These data models can capture an expert database administrator's ability to detect potential performance issues based evaluation of performance data.

One or more causes are identified for a detected performance issue at reference numeral 530. This can be accomplished by a more detailed analysis of the query execution data with detectable patterns or data models specifying a particular cause. By way of example, and not limitation, the detectable patterns or data models concern hitting resource limits, plan regression, failover, workload increase, hitting worker limits, service level objective upgrade and downgrade, memory pressure, resource violations, locking, maximum parallelism, memory contention, missing index, and slow client.

At reference numeral 540, root cause analysis is performed to determine a root cause for a performance issue. For example, a causality chain or dependency chain can be determined based on rules capturing knowledge and experience of a skilled database administrator as well time information (e.g., longevity, periodicity . . . ) associated with an incident. In this manner, causal links can be determined between multiple determined causes. The root cause is identified as the root of the causality chain. Further, root cause analysis can involve mapping identified causes to a set of known causes of greater generality than identified causes, or, in other words, a super-category.

The performance issue can be further classified based on root cause and responsibility, at numeral 550. For instance, the performance issue and root cause can be classified as a system issue, a client application issue, or an unclassified issue based on whether a detected cause matches an issue associated with the system (e.g., caused by database system), application (e.g., caused by client/customer application), or neither the system nor the application (e.g., unknown—no applicable rule or error during processing).

At numeral 560, mitigating or corrective action associated with the root cause is identified. For example, if the workload increases on a website application causing requests to fail, the corrective action can be to scale-up a database to handle the workload. The corrective action can be known and linked to a root cause such that the corrective action can be looked up by the root cause (e.g., indexed in separate structure or included with root cause).

At numeral 570, an alert can be generated to notify a responsible individual or entity as to the presence, cause, and corrective action associated with a performance issue. For application issues, a designated customer/end-user of a database can be notified by way of a preferred communication channel such as through a cloud service portal, email address, or phone number. System issues can be processed differently than application issues. In one instance, system issues can be transferred to an appropriate engineering team responsible for a particular component or sub-component which is the root cause of a performance issue. If a cause is classified as unknown or error, these causes can also be transferred to an engineering team responsible for research, development, and improvement of the system.

Additionally, or alternatively, at numeral 575, the identified corrective action can be automatically applied. In other words, corrective action can be recommended to a user to improve performance or optionally automatically initiated in order to fix the issue as soon as possible and reduce the negative impact on application workload. For example, if the corrective action involves a database, the corrective action could be automatically triggered, whereas a recommendation could be made to user if the corrective action concerns a client application.

Figure 6:
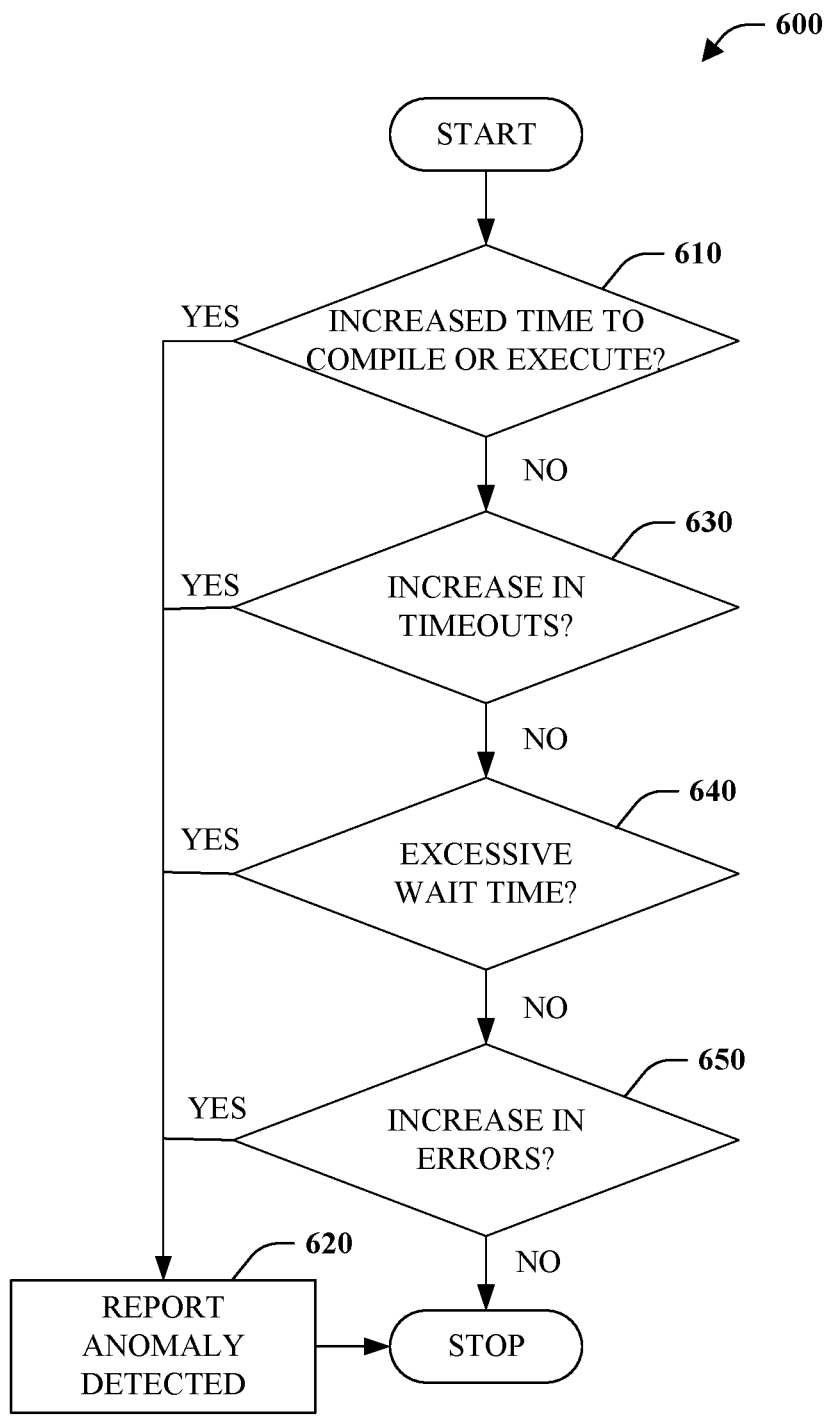
FIG. 6 is a flow chart diagram of a method of detecting a performance issue.

FIG. 6 depicts a method of detecting a performance issue 600. Query execution data can be analyzed for different factors indicative of poor performance such as performance degradation. These factors can encode anomaly detection and pattern recognition of a skilled database administrator or consultant. At reference numeral 610, a determination is made as to whether or not time to compile or execute a query has increased based on baseline times, for example, of a past measured performance period. This can be accomplished by considering query execution count as well as average compile and execution time. If compile or execution time has increased ("YES"), the method moves to numeral 620, wherein a detected performance anomaly is reported. Stated differently, a performance issue has been detected, namely performance degradation. If compile or execution has not increased ("NO"), the method continues at numeral 630.

At numeral 630, a determination is made as to whether or not there has been an increase in timeouts from a predetermined baseline, wherein a timeout can correspond to a query that did not complete execution prior to the expiration of a predetermined period of time. For example, a number of timeouts can be a number of individual queries that timeout before execution is complete and number of timeouts that occurred before individual queries reach the execution stage. Consideration can also be given to the number of query requests made to a database and the workload can be accounted for during a monitored period. If there has been an increase in timeout queries ("YES") the method proceeds to numeral 620, wherein a detected performance anomaly is reported. Alternatively, if there has not been an increase in timeout queries relative to a baseline ("NO"), the method continues to numeral 640.

A determination is made, at numeral 640, as to whether or not there has been excessive wait time compared to a predetermined baseline. An increase in the time a query is waiting during its execution lifecycle can be detected based on metrics including reaching resource limits, reaching worker thread limits, reaching elastic pool resource limits, reaching session limits, page latch contention, excessive database locking, and memory pressure, among other things. If there has been excessive wait time, a detected anomaly is reported at numeral 620. If there has not been excessive wait time, the method continues to numeral 650.

At numeral 650, a determination is made as to whether or not there has been an increase in errors. Individual queries can be monitored and an increase in the number of queries that have errors detected compared to a predetermined baseline such last measured period. Critical exceptions can also be monitored and compared to a threshold indicative of a performance issue. If an increase in errors has been detected ("YES"), a detected anomaly is reported or flagged. If there has not been an increase in errors ("NO"), the method terminated without detecting any performance issues.

Figure 7:
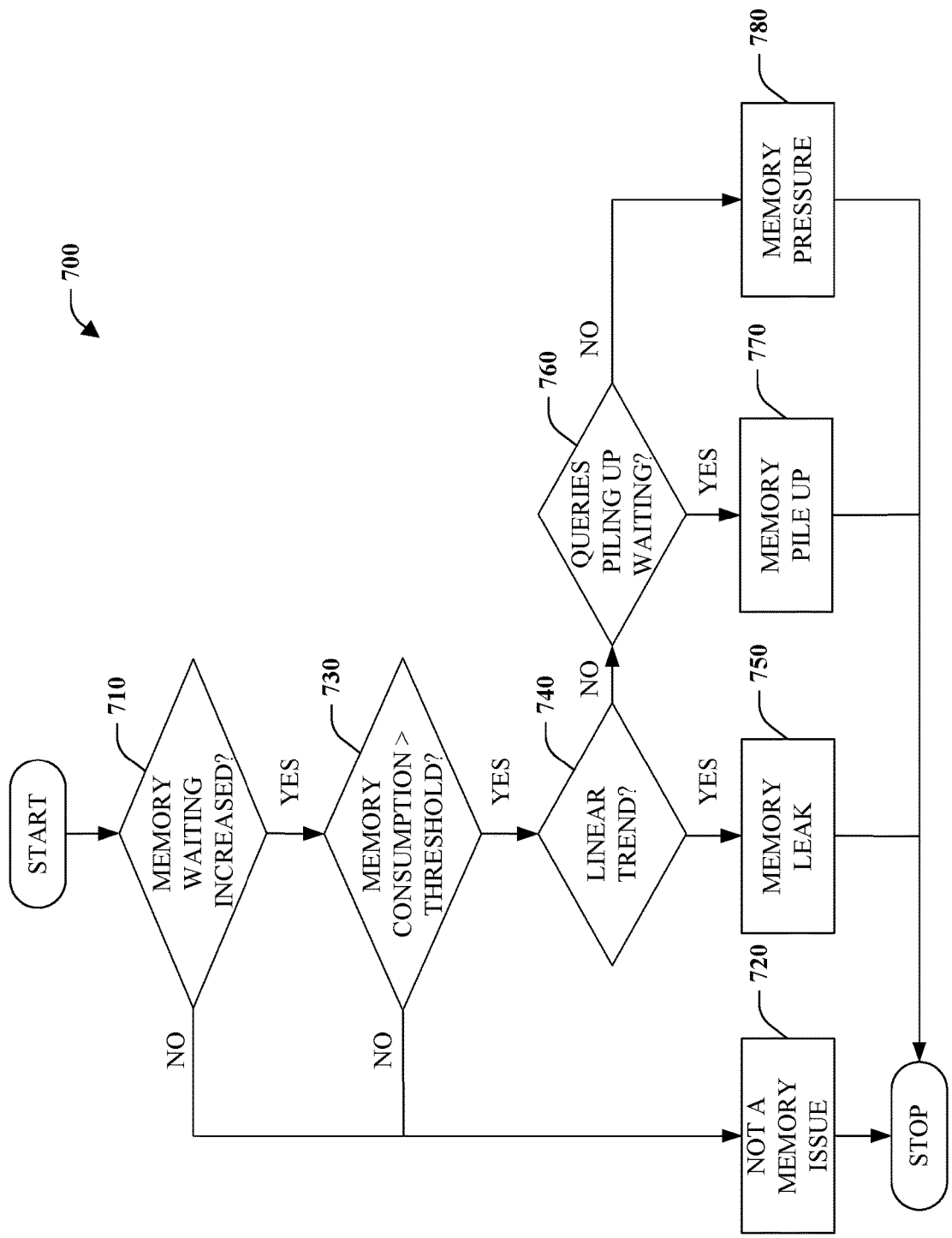
FIG. 7 is a flow chart diagram of a method of determining a cause of a performance issue.

FIG. 7 illustrates a method of determining a cause of a performance issue 700. In this example embodiment, determining a cause pertains to memory. Of course, areas besides memory can also be evaluated as a cause. At reference numeral 710, a determination is made as to whether or not memory waiting has increase from a baseline such as a past measured period. Further, rather than simply any increase a degree of increase can be used. If memory has not increased ("NO"), the method can proceed to numeral 720 in which it is noted that the performance issue is not caused by a memory issue prior to terminating. If memory waiting has increased ("YES"), the method continues at numeral 730 to determine whether or not memory consumption is greater than a predetermined threshold. If memory consumption is less than the threshold ("NO"), prior to terminating it can be noted at 720 that the performance issue is not a memory issue. If memory consumption is greater than the threshold ("YES"), the method continues at numeral 740 where a determination is made as to whether or not there is a linear trend or quick linear increase of memory. If there is a linear trend ("YES"), this issue is classified as a memory leak at numeral 750. If there is not a linear trend ("NO"), the method continues at numeral 760, in which a determination is made regarding whether or not queries are piling up waiting. If queries are piling up, or accumulating, waiting for memory ("YES"), memory pile up is noted as the cause at numeral 770. Alternatively, if queries are not piling up waiting ("NO"), the method continues at reference numeral 780, wherein it is noted that the cause of the issue is memory pressure.

Figure 8:
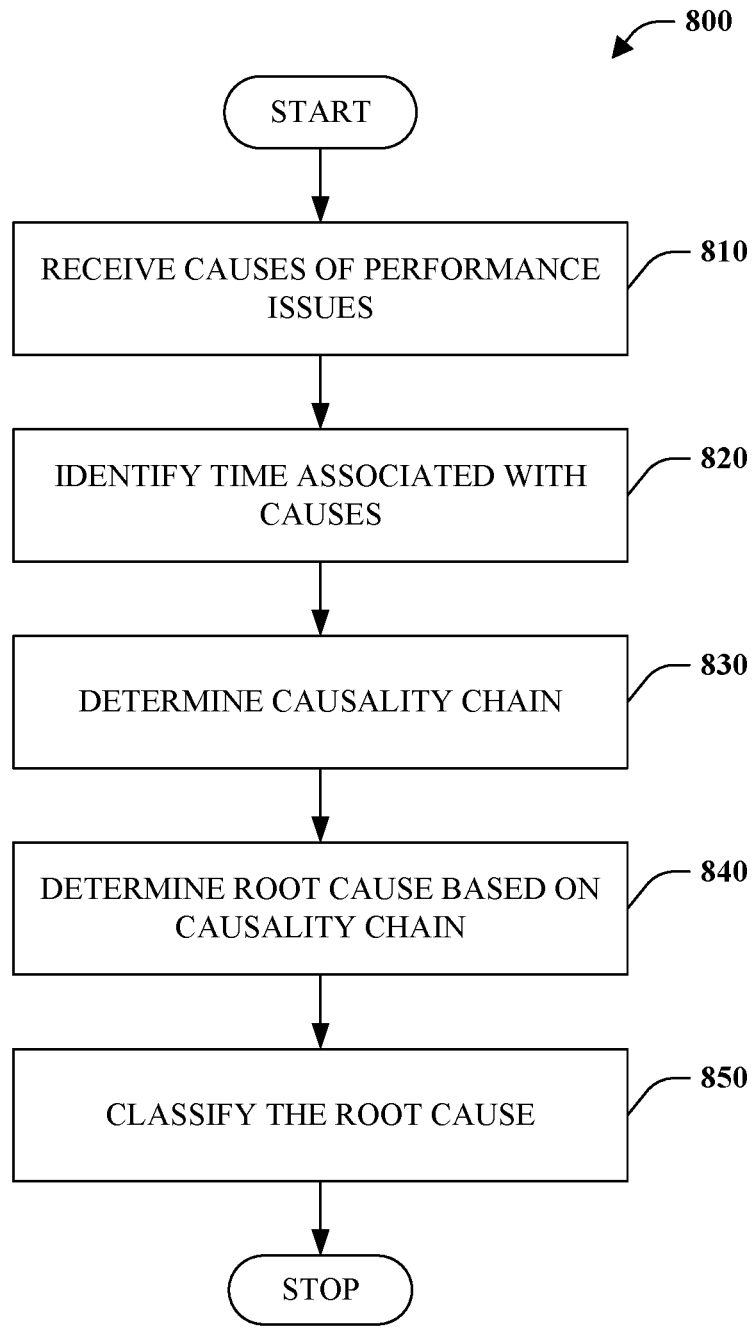
FIG. 8 is a flow chart diagram of a method of cause refinement.

FIG. 8 is a flow chart diagram of a method of cause refinement 800. At reference numeral 810, one or more determined causes of a performance issue, such as a performance degradation, are received. At numeral 820, one or more time properties are associated with the causes. A time property can include origination time, longevity, and periodicity, among other things. A causality chain is generated at numeral 830 based the causes, rules, and time properties. In other words, dependency amongst a number of causes can be based on time properties. At reference numeral 840, the root cause of a plurality of causes is determined based on the causality chain. In particular, the root or head node of the causality chain can be identified as the root cause. At numeral 850, the identified root node can be classified or ascribed a more general cause. In accordance with one embodiment, the root cause can be identified as a system issue, client application issue, or unclassified issue.

Figure 9:
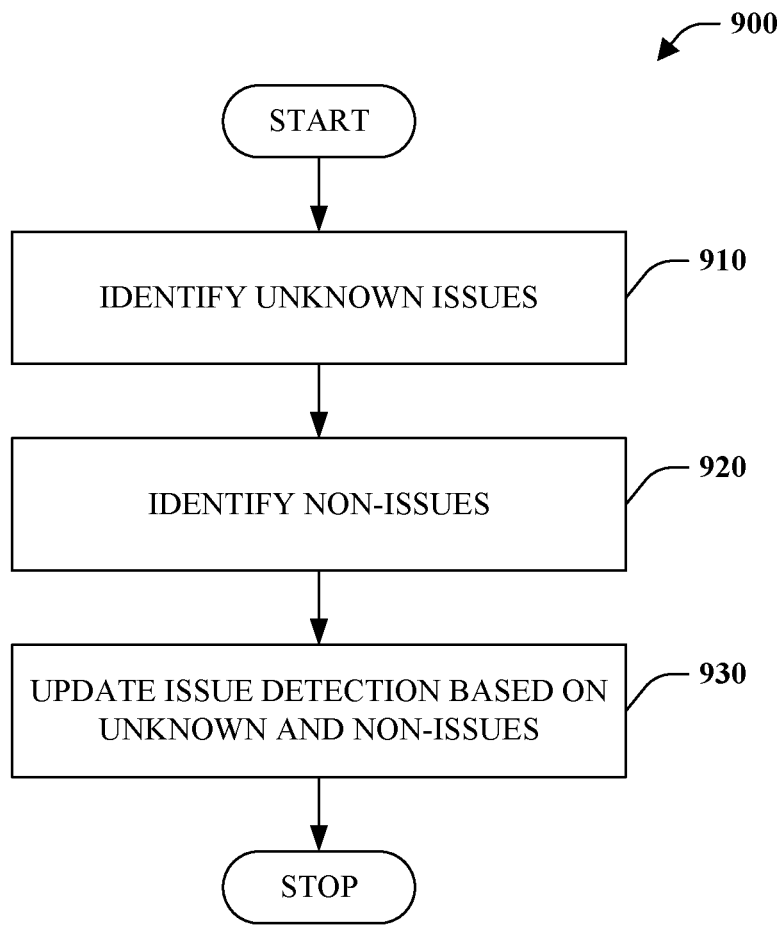
FIG. 9 is a flow chart diagram of a method of updating performance issue detection.

FIG. 9 depicts a method of updating performance issue detection 900. In accordance with one aspect, the method can be implemented by the learning component 190 of FIG. 1. At reference numeral 910, unknown performance issues can be identified. These can be performance issues for which there currently is no corresponding cause. At numeral 920, non-issues are identified. Non-issues are performance issues that are detected by or triggered by a screening mechanism for further processing, but upon such further processing it is determined it the performance issue is not an actually a performance issue but rather a non-issue. At reference numeral 930, updates are implemented to address the unknown issues and the non-issues. With respect to non-issues, the detection component 140 or like mechanism can be updated such that it does not detect a performance issue again with respect to the characteristics of the determined non-issue. With respect to the unknown performance issues, they are actual issues associated with poor performance. However, the cause component 150 or like mechanism does not have a data model or detectable pattern to by which to classify the performance issue. Accordingly, the cause component 150 can be updated with a data model or detectable pattern that ascribes a cause to the performance issue. One exemplary method for learning such data model or pattern is described next.

Figure 10:
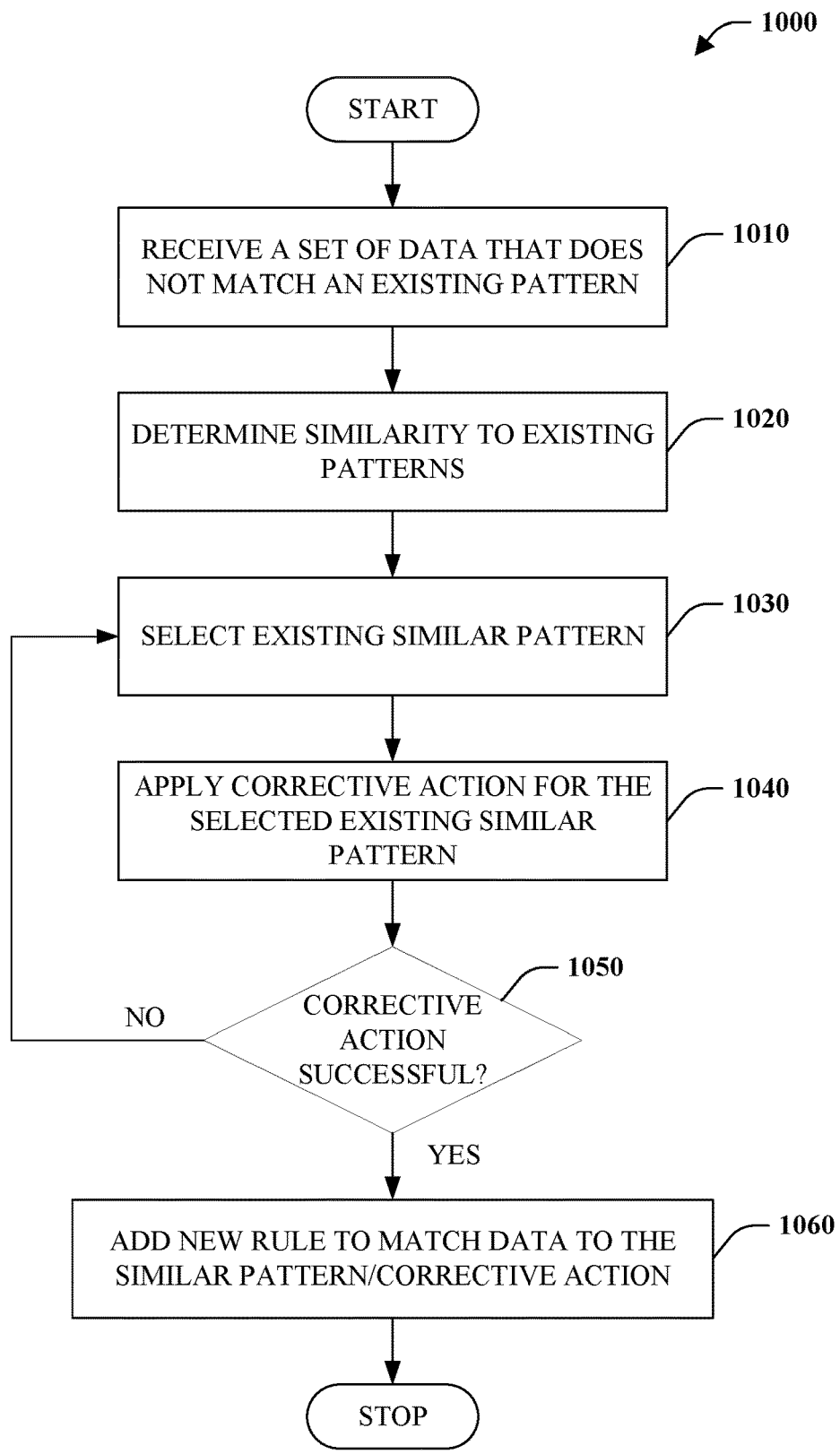
FIG. 10 is a flow chart diagram of a self-learning method.

FIG. 10 is a flow chart diagram depicting a self-learning method 1000. At reference numeral 1010, a set of data that does not match an existing pattern is received, retrieved, or otherwise obtained or acquired. At reference numeral 1020, similarity is determined with respect to existing patterns. At numeral 1030, an existing pattern that is similar is selected. Next, the corrective action associated with the similar pattern can be applied at numeral 1040. At reference numeral 1050, a determination is made as to whether the corrective action was successful in mitigating or resolving the performance issue. If the corrective action was not successful ("NO"), the method loops back to numeral 1030 to select a different similar pattern. The looping can continue until the corrective action is deemed successful. If the corrective action is successful ("YES"), a new rule and/or data model or pattern can be added, at numeral 1060, to match the data to a similar pattern with whose corrective action is also successful in overcoming the performance issue associated with the received data. Of course, more complicated learning can be performed such as when the successful corrective action is a combination or hybrid of different corrective actions, among other things.

The disclosed system and methods for automatic database troubleshooting scales well across a large number or databases. What follows is an exemplary implementation for purposes of clarity and understanding with respect to aspects of this disclosure. This is of course only an example and not meant to limit aspects of the disclosure. As per detection, eight or more detection models can be employed. Each of these models can be data science models that observe one statistic whose deterioration might be noticeable by a customer such as query durations, compile times, exceptions, query count (e.g., constant recompiles). These models can be run every fifteen minutes, and databases with performance regressions undergo categorization. Over twenty-five million different queries from over one million databases can be checked for regression every fifteen minutes. For each database for which potential regression was detected, various database statistics can be analyzed to determine what changed (e.g., worsened compared to previous behavior) so that all possible causes for regression can be identified. For example, more than twenty different high-precision data science models can be used to provide causes for regression. Super-categorization is a rule-based expert system, which combines facts from categorization and time dimension layer, maps them to a library of known issues, classifies the issues on whether they are customer or system and decides on future actions such as notification and/or automatic implementation of corrective action. More than two hundred rules can be executed around three hundred thousand times a day to perform super-categorization at scale running across a large number of databases.

The subject disclosure has focused on performance issues and more particular regression over time. However, disclosed database troubleshooting systems and methods can also be applied to different performance issues and even non-performance issues. For instance, troubleshooting can be performed with respect to database availability, among other things.

Aspects of the subject disclosure pertain to the technical problem of resolving database system performance issues. The technical features associated with addressing this problem comprise acquiring metrics regarding query execution and automatically, without human intervention, detecting issues based on the metrics such as delay in query execution, increase in timeouts, excessive wait time, or errors. After detection, analysis is performed to provide insight into the detected issue. More particularly, the cause and corrective action is determined automatically.

The subject disclosure supports various products and processes that perform, or are configured to perform, various actions regarding automatic database troubleshooting. What follows are one or more exemplary systems and methods.

A system facilitates database troubleshooting, comprising: a processor coupled to a memory, the processor configured to execute the following computer executable components stored in the memory: a detection component that detects a performance issue automatically based on comparison of query execution data for one or more queries executed by a database system to previous execution data or a predetermined threshold; and a cause component that determines one or more causes of the potential issue automatically by matching the query execution data to a pattern of a plurality of patterns that encode candidate causes. The system further comprises a collection component that collects the query execution data for the one or more queries executed by the database system, and the collection component saves the query execution data to a query store accessible by the detection component and cause components. The detection component further detects the potential performance issue by a comparison of query execution data related to at least one of query duration, timeout requests, execution wait time, or errored requests. The system further comprises a cause refinement component that determines dependency between a set of causes and identifies the root cause based on the dependency. In one instance, the cause refinement component is implemented as a rule-based expert system. The system further comprises a corrective action component that determines a corrective action based on the root cause. The corrective action component further automatically applies the corrective action to the database system.

A method performed by a database troubleshooting system comprising at least one processor coupled to a memory storing machine-executable instructions, which, when executed by the processor, controls the system to perform acts, comprising: receiving query execution data for one or more queries executed by a database system; detecting a potential performance issue automatically based on the query execution data and comparison of the query execution data to previous query execution data or a predetermined threshold; and determining one or more causes for the potential performance issue automatically by matching the query execution data to one or more patterns of a plurality of patterns that encode candidate causes. The method further comprises detecting the potential performance issue by comparing query execution data related to at least one of query duration, timeout requests, execution wait time, or errored requests. The method further comprises determining the one or more causes with patterns that encode candidate causes comprising at least one of resource limits reached, workload increase, memory pressure, or locking. The method further comprises determining a causality chain among two or more of the one or more determined cause, and determining a root cause of a performance issue from the causality chain. The method of further comprises classifying a performance issue as a system issue or application issue based on the root cause. The method further comprises identifying a corrective action based on the root cause. Further, the method comprises automatically applying the corrective action to the database system.

A computer-readable storage medium having instructions stored thereon that enable at least one processor to perform a method upon execution of the instructions, the method comprising: receiving query execution data for one or more queries executed by a database system; detecting a potential performance issue automatically based on the query execution data and comparison of the query execution data to previous query execution data or a predetermined threshold; and determining one or more causes for the potential performance issue automatically by matching the query execution data to one or more patterns of a plurality of patterns that encode candidate causes. The method further comprises determining a causality chain among two or more of the one or more determined causes and determining a root cause based on the causality chain. The method further comprises identifying a corrective action based on the root cause, and automatically applying the corrective action to the database system.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
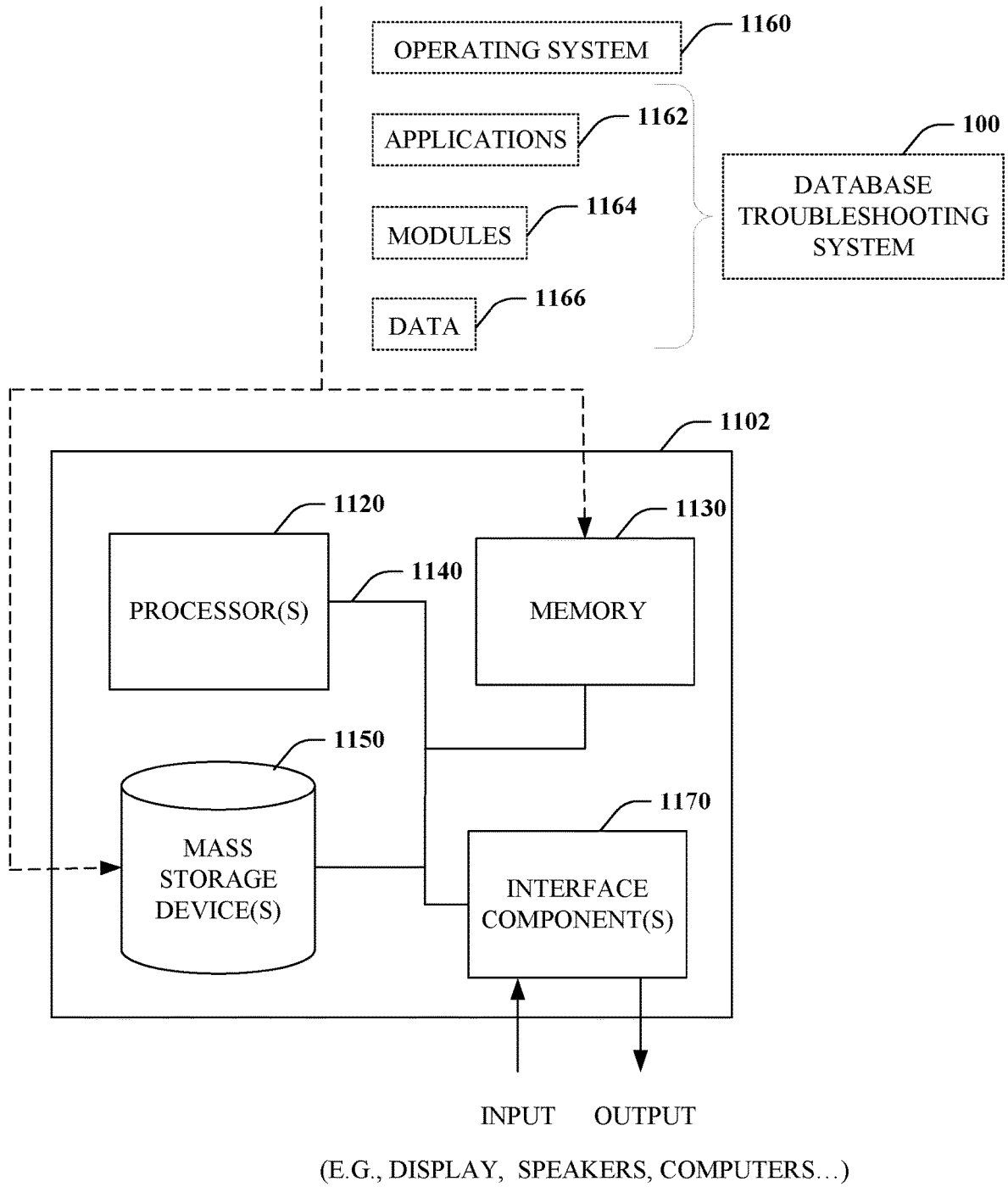
FIG. 11 is a schematic block diagram illustrating a suitable operating environment for aspects of the subject disclosure.

In order to provide a context for the disclosed subject matter, FIG. 11 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects of the disclosed subject matter can be practiced on stand-alone computers. In a distributed computing environment, program modules may be located in one or both of local and remote memory devices.

Aspects of the database troubleshooting system 100 and associated methods can be executed in a distributed environment. In one instance, a database system 110 subject to troubleshooting can be implemented as a distributed network-based, or cloud, service. Further, data collection, performance issue detection, cause identification and refinement can be spread across a number of compute nodes, thus delegating computation power to portions that are well achievable on separate machines. As a result, time to detect, understand, and mitigate a performance issue is reduced providing improved user experience.

With reference to FIG. 11, illustrated is an example general-purpose computer or computing device 1102 (e.g., desktop, laptop, tablet, watch, server, hand-held, programmable consumer or industrial electronics, set-top box, game system, compute node . . . ). The computer 1102 includes one or more processor(s) 1120, memory 1130, system bus 1140, mass storage device(s) 1150, and one or more interface components 1170. The system bus 1140 communicatively couples at least the above system constituents. However, it is to be appreciated that in its simplest form the computer 1102 can include one or more processors 1120 coupled to memory 1130 that execute various computer executable actions, instructions, and or components stored in memory 1130.

The processor(s) 1120 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1120 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) can be a graphics processor.

The computer 1102 can include or otherwise interact with a variety of computer-readable media to facilitate control of the computer 1102 to implement one or more aspects of the disclosed subject matter. The computer-readable media can be any available media that can be accessed by the computer 1102 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computer 1102. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1130 and mass storage device(s) 1150 are examples of computer-readable storage media. Depending on the exact configuration and type of computing device, memory 1130 may be volatile (e.g., RAM), non-volatile (e.g., ROM, flash memory . . . ) or some combination of the two. By way of example, the basic input/output system (BIOS), including basic routines to transfer information between elements within the computer 1102, such as during start-up, can be stored in nonvolatile memory, while volatile memory can act as external cache memory to facilitate processing by the processor(s) 1120, among other things.

Mass storage device(s) 1150 includes removable/non-removable, volatile/non-volatile computer storage media for storage of large amounts of data relative to the memory 1130. For example, mass storage device(s) 1150 includes, but is not limited to, one or more devices such as a magnetic or optical disk drive, floppy disk drive, flash memory, solid-state drive, or memory stick.

Memory 1130 and mass storage device(s) 1150 can include, or have stored therein, operating system 1160, one or more applications 1162, one or more program modules 1164, and data 1166. The operating system 1160 acts to control and allocate resources of the computer 1102. Applications 1162 include one or both of system and application software and can exploit management of resources by the operating system 1160 through program modules 1164 and data 1166 stored in memory 1130 and/or mass storage device(s) 1150 to perform one or more actions. Accordingly, applications 1162 can turn a general-purpose computer 1102 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, database troubleshooting system 100, or portions thereof, can be, or form part, of an application 1162, and include one or more modules 1164 and data 1166 stored in memory and/or mass storage device(s) 1150 whose functionality can be realized when executed by one or more processor(s) 1120.

In accordance with one particular embodiment, the processor(s) 1120 can correspond to a system on a chip (SOC) or like architecture including, or in other words integrating, both hardware and software on a single integrated circuit substrate. Here, the processor(s) 1120 can include one or more processors as well as memory at least similar to processor(s) 1120 and memory 1130, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the database troubleshooting system 100 and/or associated functionality can be embedded within hardware in a SOC architecture.

The computer 1102 also includes one or more interface components 1170 that are communicatively coupled to the system bus 1140 and facilitate interaction with the computer 1102. By way of example, the interface component 1170 can be a port (e.g. serial, parallel, PCMCIA, USB, FireWire . . . ) or an interface card (e.g., sound, video . . . ) or the like. In one example implementation, the interface component 1170 can be embodied as a user input/output interface to enable a user to enter commands and information into the computer 1102, for instance by way of one or more gestures or voice input, through one or more input devices (e.g., pointing device such as a mouse, trackball, stylus, touch pad, keyboard, microphone, joystick, game pad, satellite dish, scanner, camera, other computer . . . ). In another example implementation, the interface component 1170 can be embodied as an output peripheral interface to supply output to displays (e.g., LCD, LED, plasma . . . ), speakers, printers, and/or other computers, among other things. Still further yet, the interface component 1170 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system that facilitates database troubleshooting, comprising:
a processor coupled to a memory, the processor configured to execute the following computer executable components stored in the memory:
a detection component that detects a regression of performance of a database system automatically based on comparison of query execution data for one or more queries executed by the database system to previous execution data;
a cause component that analyzes the regression of performance by automatically matching the query execution data to a pattern of a plurality of patterns that encode candidate causes to determine one or more causes of the regression of performance;
a learning component that, responsive to the cause component not finding a match to at least one of the plurality of patterns, determines existing patterns in the plurality of patterns having a similarity to the query execution data; and
a corrective action component that:
automatically applies a first corrective action corresponding to a first existing pattern of the existing patterns and determines whether the first corrective action was successful at mitigating the regression of performance; and
automatically applies a second corrective action corresponding to a second existing pattern of the existing patterns responsive to determining that the first corrective action was unsuccessful and determines whether the second corrective action was successful at mitigating the regression of performance.

2. The system of claim 1 further comprises a collection component that collects the query execution data for the one or more queries executed by the database system.

3. The system of claim 2, the collection component saves the query execution data to a query store accessible by the detection component and cause component.

4. The system of claim 1, the detection component further detects the regression of performance by a comparison of query execution data related to at least one of query duration, timeout requests, execution wait time, or errored requests.

5. The system of claim 1 further comprises a cause refinement component that determines dependency between a set of causes and identifies the root cause based on the dependency.

6. The system of claim 5, the cause component and refinement component are implemented as a rule-based expert system.

7. The system of claim 5, the corrective action component further determines at least one of the first corrective action or the second corrective action based on the root cause.

8. The system of claim 7, the corrective action component further automatically applies at least one of the first corrective action or the second corrective action to the database system.

9. A method performed by a database troubleshooting system comprising at least one processor coupled to a memory storing machine-executable instructions, which, when executed by the processor, controls the system to perform acts, comprising:
   receiving query execution data for one or more individual queries executed by a database system;
   detecting a regression of performance of the database system automatically based on the query execution data and comparison of the query execution data to previous query execution data;
   analyzing the regression of performance by automatically matching the query execution data to one or more patterns of a plurality of patterns that encode candidate causes to determine one or more causes of the regression of performance;
   responsive to not finding a match to at least one of the plurality of patterns, determining existing patterns in the plurality of patterns having a similarity to the query execution data;
   automatically applying a first corrective action corresponding to a first existing pattern of the existing patterns and determining whether the first corrective action was successful at mitigating the regression of performance; and
   automatically applying a second corrective action corresponding to a second existing pattern of the existing patterns responsive to determining that the first corrective action was unsuccessful and determining whether the second corrective action was successful at mitigating the regression of performance.

10. The method of claim 9 further comprises detecting the regression of performance by comparing query execution data related to at least one of query duration, timeout requests, execution wait time, or errored requests.

11. The method of claim 9 further comprises determining the one or more causes with patterns that encode candidate causes comprising at least one of resource limits reached, workload increase, memory pressure, or locking.

12. The method of claim 9 further comprises determining a causality chain among two or more of the determined causes.

13. The method of claim 12 further comprises determining a root cause of a performance issue from the causality chain.

14. The method of claim 13 further comprises classifying a performance issue as a system issue or application issue based on the root cause.

15. The method of claim 13 further comprises identifying at least one of the first corrective action or the second corrective action based on the root cause.

16. The method of claim 15 further comprises automatically applying at least one of the first corrective action or the second corrective action to the database system.

17. A computer-readable storage medium having instructions stored thereon that enable at least one processor to perform a method upon execution of the instructions, the method comprising:
   receiving query execution data for one or more individual queries executed by a database system;
   detecting a regression of performance of the database system automatically based on the query execution data and comparison of the query execution data to previous query execution data; and
   analyzing the regression of performance by automatically matching the query execution data to one or more patterns of a plurality of patterns that encode candidate causes to determine one or more causes of the regression of performance;
   responsive to not finding a match to at least one of the plurality of patterns, determining existing patterns in the plurality of patterns having a similarity to the query execution data;
   automatically applying a first corrective action corresponding to a first existing pattern of the existing patterns and determining whether the first corrective action was successful at mitigating the regression of performance; and
   automatically applying a second corrective action corresponding to a second existing pattern of the existing patterns responsive to determining that the first corrective action was unsuccessful and determining whether the second corrective action was successful at mitigating the regression of performance.

18. The computer-readable storage medium of claim 17, the method further comprises:
   determining a causality chain among two or more of the one or more determined causes; and
   determining a root cause based on the causality chain.

19. The computer-readable storage medium of claim 18, the method further comprises identifying at least one of the first corrective action or the second corrective action based on the root cause.

20. The computer-readable storage medium of claim 19, the method further comprises automatically applying at least one of the first corrective action or the second corrective action to the database system.

* * * * *